Figure 1:
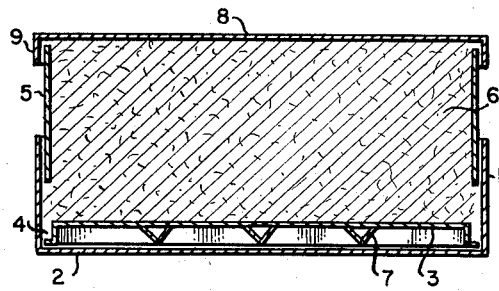

July 2, 1963   H. A. ROSSEN   3,095,647
CHEESE MOULD AND INSERT FOR SUCH CHEESE MOULD
Filed Oct. 29, 1959

INVENTOR
HANS ANDREAS ROSSEN

BY *Stevens, Davis, Miller & Mosher*

ATTORNEYS

United States Patent Office 3,095,647
Patented July 2, 1963

3,095,647
CHEESE MOULD AND INSERT FOR SUCH
CHEESE MOULD
Hans Andreas Rossen, Tiset pr Gram, Denmark
Filed Oct. 29, 1959, Ser. No. 849,552
Claims priority, application Denmark Nov. 1, 1958
5 Claims. (Cl. 31—45)

The present invention relates to a cheese mould of the type having a loose slit wall portion—a shell—made of plate material, which can slide into and out of the mould against the inner side of the mould wall.

Cheese moulds of this type are particularly intended for the production of pressed cheese and when for the mould an "external" lid is used, i.e. a lid having a skirt which during the pressing operation encircles the uppermost edge of the shell, the mould is normally used in the manner that at the commencement of the actual pressing operation the shell is introduced a short distance down into the mould but gradually as the pressing progresses, the shell will be pressed longer and longer down into the mould. Hence care should be taken to use such quantity of cheese mass that the shell is not pressed down to the bottom until the cheese mass has been pressed sufficiently. It is, of course, difficult to weigh-off the quantity of cheese mass to be used so exactly that sufficient pressing has been obtained exactly when the shell has reached the bottom position and, consequently, care is, therefore, taken to use so much cheese mass as to obtain sufficiently guarantee that the cheese mass has been pressed to the desired degree before the shell has reached the bottom position. Experience shows that normally when the desired degree of pressing has been obtained there will be a certain distance from the mould bottom to the lowermost edge of the shell, a distance which by experience may be kept rather small and which by way of example may be from 0.5 to 1 cm. and perhaps sometimes up to 1.5 or 2 cm. as a maximum. Under the stated conditions there will under the lowermost edge of the shell be a "bulging" of cheese mass which on the ready-pressed cheese taken out of the would will appear as a disfiguring and in many cases very inconvenient rim which is to be cut away. If, for example, the production of the so-called rind-free cheese is concerned the cutting-away of this rim is then a necessity in order to secure, when later evacuating the bags of plastic foil in which the cheeses are wrapped, that the foil material fits tightly round the cheese. But also where rind-cheese is concerned it is desirable, if not for other reasons then at any rate with regard to the appearance, to cut away the said rim which is not only tantamount to wasting material but is also tantamount to extra work and in any circumstance to a less appealing appearance of the cheese surface.

The above drawbacks appear no matter whether moulds in which cheese cloth is used or molds in which no cheese cloth is used are concerned. The drawbacks may be avoided by using the cheese mould according to the invention which is of the said known type and which is characterized in that the bottom of the cheese mould is so designated as to form together with the mould wall and along the entire circumference of said mould wall a groove of suitable height which encircles the lowermost part of the shell when said shell bearing against the mould wall is introduced wholly into the mould, the width of said groove not substantially exceeding the plate thickness of the shell.

The terms "the bottom" and "the lowermost part" refer to the position wherein the mould end wall is located at the base of the mould and the shell is displaced downwardly, but of course the end wall could be located at the top of the mould with the shell displaced upwardly, or the end wall could be located in any other position without departing from the scope of this invention. Further, the word "bottom" means the end wall which gets in direct contact with the cheese mass, no matter whether the said wall is the only end wall or is located, for example, loosely located, on another outer end wall. The term "suitable height" in connection with the mention of the groove indicates here a height which by way of experience is sufficient to ensure by the cheese production, for which the cheese mould is intended, that the lowermost edge of the shell will at least reach quite down to the groove.

The groove in the cheese mould according to the invention should of course be as narrow as possible, i.e. just so wide as to permit the shell of moving freely up and down in said groove. During the use of the mould it may happen that a thin film of cheese mass is pressed down between the lowermost part of the shell and the inner wall of the groove. If the said film does not already fall off by its own weight when taking the cheese out of the mould, it may very easily be wiped off without leaving marks on the surface of the cheese.

The bottom of the said cheese mould may be fixedly connected with the mould wall, for example be welded-on to said wall. The bottom may be detachable, and according to the invention it may expediently be constructed as a loose insert. The use of such insert affords many advantages, inter alia the one that the cleaning of the mould is facilitated. The insert may be made and sold for being placed in moulds already in use.

Consequently, the invention also relates to an insert for use in a cheese mould of the type in question. This insert is characterized in that it consists of a disc of a shape corresponding to the cross-sectional area of the cheese mould, which disc is of such height and of such cross-sectional area that when being introduced into the cheese mould it can form together with the mould wall the desired groove for the lowermost portion of the shell, and which disc is provided with guiding means for fixing the position of the disc in the cheese mould.

For the purpose of making the said disc as light as possible it may according to the invention expediently consist of a thin piece of plate, if so desired provided with ribs or the like reinforcing members, said piece of plate having a skirt extending from the edge, which skirt is to form the innermost wall in the groove in the cheese mould. The said reinforcing members shall serve to prevent the piece of plate from bending during the pressing of the cheese mass.

The guiding means for the insert may be designed in many different ways. Thus, according to the invention the disc may at the bottom thereof be provided with a plurality of tongues projecting from the disc and extending along the circumference thereof at spaced intervals, which tongues may serve as spacing means so that after the introduction into the mould the disc may all the time have the desired distance from the mould wall corresponding to the width of the groove. This embodiment affords the particular advantage that it may be used for practically any construction of cheese mould of the type in question comprising a shell. Thus, it may always be used for such moulds, the wall of which is at bottom provided with a quite small inwardly projecting flange intended for supporting a loose bottom plate. This embodiment affords the advantage of being material-saving and being particularly easy to manufacture. When here speaking of "lowermost" part of the disc, or if another corresponding term is used, this refers always to the position of the disc in the cheese mould, as "below" on the disc corresponds to the bottom of the groove.

As mentioned above the invention may be used with advantage no matter whether the question is of cheese moulds in which cheese cloth is used or of sieve-perforated cheese moulds in which no cheese cloth is used.

A cheese mould of this latter type is well known. By using the present invention in connection with the latter type of mould, the drawback which consists in that the drainage of the whey will be less good on a strip of the surface of the cheese which is not covered by the shell, may in a particularly partical manner be avoided.

Figure 4:
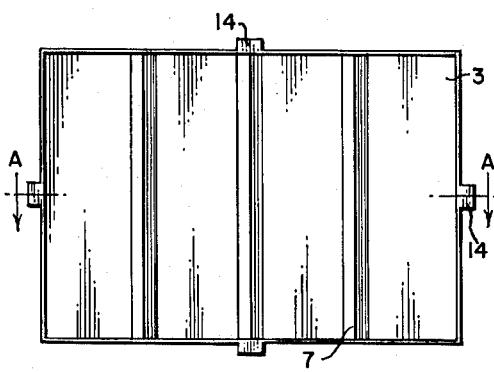
Figure 5:
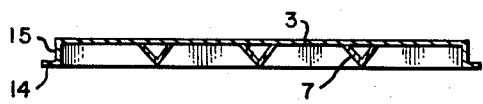

The invention is explained in detail in the following description of some examples of embodiments, shown in the accompanying drawing, of a cheese mould and an insert according to the invention. On the drawing FIGURE 1 is a central longitudinal sectional view of an embodiment of the cheese mould according to the invention with a loose insert, FIGURE 2 is an enlarged sectional view similar to FIGURE 1, FIGURE 3 is a sectional view of another embodiment of the present invention, FIGURE 4 is a bottom plan view of the insert shown in FIGURE 1, and FIGURE 5 is a sectional view of the same insert along the line A—A in FIGURE 4.

The mould shown in FIGURE 1 has a mould wall 1, an outer end-bottom 2 and a loose insert 3 which together with the mould wall 1 forms a groove 4, in which the lower edge of a slit single piece shell 5 may be introduced when pressing the cheese mass 6 being present in the mould. The insert 3 is provided with reinforcing ribs 7 to prevent the insert which is made of comparatively thin plate, from bending during the pressing operation. The shell 5 is provided with a lid 8 having a skirt 9 which grips round the uppermost edge of the shell so that a pressure exerted on the lid will push the shell inwardly into the mould. The lid may be provided with a conventional reinforcement (not shown).

Figure 2:
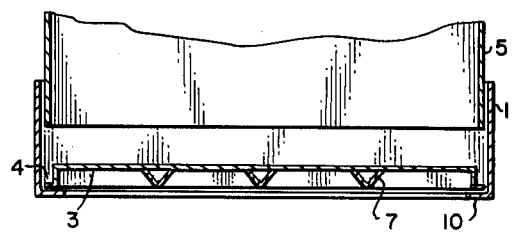

FIGURE 2 only illustrates the lowermost part of the mould and part of the shell. In this embodiment the mould wall 1 is at the bottom provided with an inwardly projecting flange on which the insert 3 with the reinforcing ribs 7 is placed.

Figure 3:
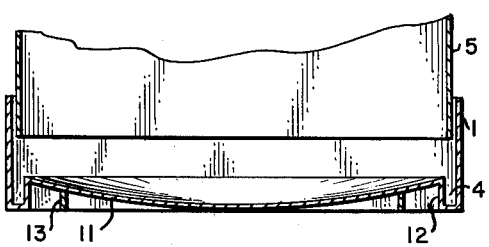

FIGURE 3 likewise shows only the lowermost part of the mould with part of the shell 5. In this embodiment there is no loose insert, but the bottom 11 which in this embodiment is arched, is fixedly connected with, for example welded-on to, the mould wall. The bottom 11 is provided with a vertical wall portion 12 which together with the mould wall 1 forms the groove 4. If necessary, the bottom may as shown be supported by means of special supporting ribs 13 or the like supporting means.

The insert shown in FIGURES 4 and 5 corresponding to the insert shown in FIGURE 1 is, as will be seen, on its sides provided with tongues 14 serving as guiding means or spacers to ensure that the insert is kept at a certain distance from the mould wall 1. The insert is made of a piece of plate of a thickness usual for metal plates for metal cheese moulds, which plate is at its edge provided with a skirt 15 on which the tongues 14 are provided.

What we claim is:

1. A cheese mold comprising a mould wall, a slit single piece shell made of plate material mounted in telescoping contact against the inner sides of the mould wall, a lid having means gripping the uppermost edge of the shell and a bottom member having a bent portion cooperating with said inner mould wall to define a groove of suitable height along the entire circumference of said mould wall, the width of said groove not substantially exceeding the plate thickness of the shell so as to receive the lowermost part of the shell when the lowermost part of the shell is introduced below the upper surface of said bottom member.

2. A cheese mould as claimed in claim 1, characterized in that the said bottom member is constructed as a loose insert.

3. An insert for use in a cheese mould as claimed in claim 2, characterized in that the bottom member consists of a disc having a shape corresponding to the cross-sectional area of the cheese mould, which disc is of such height and has such cross-sectional area that when being introduced into the cheese mould it forms together with the mould wall the desired groove for the lowermost part of the shell, said disc being provided with guiding means for fixing the position of the disc in the cheese mould.

4. An insert as claimed in claim 3, characterized in that the disc consists of a relatively thin piece of plate provided with reinforcing members, said piece of plate having a skirt depending from the edge, which skirt is to form the innermost wall of the groove in the cheese mould.

5. An insert as claimed in claim 3, characterized in that the guiding means are constituted by tongues or the like parts which at suitable intervals project from the lowermost part of the disc.

References Cited in the file of this patent

UNITED STATES PATENTS

| | | |
|---|---|---|
| 1,330,197 | Leland et al. | Feb. 10, 1920 |
| 1,643,508 | Miller | Sept. 27, 1927 |